(12) United States Patent
Müller et al.

(10) Patent No.: US 6,213,711 B1
(45) Date of Patent: Apr. 10, 2001

(54) STEAM TURBINE AND BLADE OR VANE FOR A STEAM TURBINE

(75) Inventors: Karl-Heinrich Müller, Rheinberg; Wilfried Ulm, Mülheim an der Ruhr; Ralf Bell, Kerken; Volker Simon, Mülheim an der Ruhr, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/410,828

(22) Filed: Oct. 1, 1999

Related U.S. Application Data

(63) Continuation of application No. PCT/DE98/00788, filed on Mar. 16, 1998.

(30) Foreign Application Priority Data

| Apr. 1, 1997 | (DE) | 197 13 402 |
|---|---|---|
| Apr. 21, 1997 | (DE) | 197 16 726 |

(51) Int. Cl.[7] ............. F01D 1/02; F03B 1/04
(52) U.S. Cl. ........... 415/191; 415/220; 415/914; 416/236 R
(58) Field of Search ............... 415/191, 208.1, 415/208.2, 210.1, 220, 227, 228; 416/193 R, 193 A, 219 R, 228, 223 A, 236 R, 236 A, 248

(56) References Cited

U.S. PATENT DOCUMENTS

| 1,862,827 | * | 6/1932 | Parsons et al. | 416/224 R |
|---|---|---|---|---|
| 3,304,056 | * | 2/1967 | Sohma | 416/236 R |
| 3,481,531 | | 12/1969 | MacArthur et al. | 416/236 R X |
| 4,023,350 | | 5/1977 | Hovan et al. | 415/914 X |
| 4,135,857 | * | 1/1979 | Pannone et al. | 416/193 A |
| 4,420,288 | * | 12/1983 | Bischoff | 416/244 A |
| 4,720,239 | | 1/1988 | Owczarek | 416/236 R X |
| 5,215,439 | * | 6/1993 | Jansen et al. | 416/236 R |
| 5,337,568 | * | 8/1994 | Lee et al. | 416/236 R |
| 5,609,470 | * | 3/1997 | Dodd | 416/236 R |

FOREIGN PATENT DOCUMENTS

| 1 428 110 | | 2/1969 | (DE) . | |
|---|---|---|---|---|
| 1 937 395 | | 2/1971 | (DE) . | |
| 2 135 287 | | 1/1973 | (DE) . | |
| 36 09 541 C2 | | 9/1987 | (DE) . | |
| 90 13 099 | | 12/1991 | (DE) . | |
| 43 19 628 A1 | | 12/1994 | (DE) . | |
| 195 46 008 A1 | | 6/1997 | (DE) . | |
| 196 50 439 C1 | | 3/1998 | (DE) . | |
| 840 543 | | 7/1960 | (GB) . | |
| 2017228 | * | 10/1979 | (GB) | 415/914 |
| 2042675 | * | 9/1980 | (GB) | 415/914 |
| 52-54808 | * | 5/1977 | (JP) | 415/194 |
| 52-67404 | * | 6/1977 | (JP) | 415/914 |
| 54-151707 | * | 11/1979 | (JP) | 415/914 |
| 55-72602 | * | 5/1980 | (JP) | 415/914 |
| 58-162702 | * | 9/1983 | (JP) | 416/191 |

OTHER PUBLICATIONS

"Characteristics in flow technology of turbine blade profiles of different production qualities" (Jetter et al.), VDI Reports No. 1109, 1994, pp.241–259.

\* cited by examiner

*Primary Examiner*—John E. Ryznic
(74) *Attorney, Agent, or Firm*—Herbert L. Lerner; Laurence A. Greenberg; Werner H. Stemer

(57) ABSTRACT

The invention relates to a steam turbine (1) which has a flow duct (2) with a wall (3). Blading (5) is arranged in blading rings (55) in the flow duct (2). The wall (3) of the flow duct (2) has a grooved structure (6) which purposefully influences the flow of an active fluid (13) through the flow duct (2). In particular, a spacing surface (31) with a grooved structure (6) is located between each two blades or vanes (5) of a blading ring (55). The invention also relates to a blade or vane for a steam turbine.

18 Claims, 4 Drawing Sheets

STEAM TURBINE AND BLADE OR VANE FOR A STEAM TURBINE

CROSS-REFERENCE TO RELATED APPLICATION

This application is a continuation of copending International application No. PCT/DE98/00788, filed Mar. 16, 1998, which designated the United States.

BACKGROUND OF THE INVENTION

Field of the Invention

The invention relates, in general, to a steam turbine, and in particular, to a steam turbine with a flow duct with blading configured within it and to a blade or vane for a steam turbine.

A turbine blade or vane for use in the wet steam region of the penultimate and final stages of turbines is described in German published, non-prosecuted Patent Application DE 195 46 008 A1. Such a turbine blade or vane is subject to erosive wear due to impinging water droplets. This erosive wear is reduced by the airfoil of the turbine blade or vane having surface roughness in the region of its leading edge and the region of the suction surface of the blade or vane or in at least a partial region thereof, which surface roughness is markedly increased relative to the surface roughness of the pressure surface of the airfoil. A film of water is held on the surface of the turbine blade or vane by this surface roughness. This film of water reduces the erosive effect of impinging water droplets.

German Patent DE 36 095 41 C2 deals with the reduction of the aerodynamic drag of a body in turbulent flow. The reduction in drag is achieved by reducing the turbulent wall shear stress. For this purpose, the surface of the body is provided with ribs in a plurality of rib formations. The ribs are arranged offset to one another laterally to a flow direction and have short extensions in the flow direction. In particular, DE 36 095 41 C2 reveals such a surface structure for reducing the drag of an aircraft wing.

German published, non-prosecuted Patent Application DE 43 19 628 A1 deals with the structuring of turbomachine surfaces in contact with fluid. The flow losses are minimized by a applying a grooved structure. The special relationships of fluid pumps are taken into account in this publication.

German Utility Model G 90 13 099 relates to a rotor for extracting energy from a flowing medium or for releasing energy to a flowing medium consisting of a hub and at least one rotor blade. An increase in the efficiency of the rotor is achieved by a rotor blade of the rotor having a corrugated shape. In addition to the absolutely necessary corrugated shape, such a rotor blade can also be completely covered with grooving.

An impeller for a centrifugal compressor, in particular for a gas turbine, is described in U.S. Pat. No. 3,481,531. The impeller has vanes which extend radially outward and between which is located an impeller wall. The impeller wall is provided with grooves which extend radially outward so that a boundary layer of gas adhering to the wall is broken up and energy losses are therefore minimized.

U.S. Pat. No. 4,023,350 shows an appliance which reduces a pressure loss in a gas turbine. The appliance consists of a chain of protrusions which extends between two adjacent blades or vanes of a blading ring of the gas turbine. This chain of protrusions acts to generate a vortex so that a boundary layer thickness, and therefore losses due to transverse flows, are reduced.

In the VDI reports No. 1109 of 1994, Jetter and Rieβ describe on page 241 of the article "Aerodynamic Properties of Turbine Blading Profiles of Different Manufacturing Qualities", the influence of surface roughness on the efficiency of turbine blading profiles. The article states that surface roughnesses, such as milling grooves, have an influence on the profile loss but, because of the importance of other parameters, this influence cannot yet be accurately quantified.

A steam turbine is considered in the book "Turbomachines" by Klaus Menny, B. G. Teubner Stuttgart, 1995. It is stated therein that water turbines, steam and gas turbines, windmills, centrifugal pumps and centrifugal compressors and propellers are combined under the collective designation of "turbo-machines". A common feature of all these machines is that they are used for the purpose of withdrawing energy from an active fluid in order to drive another machine or to supply energy to an active fluid in order to increase the pressure of the latter. Using a simple turbine as an example, the mode of operation of a turbo-machine is explained. The active fluid enters the machine and flows first through a blading ring of stationary guide vanes. This increases the velocity and therefore the kinetic energy of the active fluid. Its pressure and therefore its potential energy are reduced. At the same time, the shape of the guide vanes produces a velocity component in the peripheral direction of a rotor blade ring downstream of the guide vane ring. By means of the rotor blade ring, the active fluid gives up its kinetic energy to the rotor, to which the rotor blade ring is connected, because the direction and frequently also the magnitude of the velocity of the active fluid is changed when flowing over the rotor blades. The rotor blade ring is made to rotate. The active fluid emerges from the machine with reduced energy content. The ratio between the mechanical energy gained from the turbine and the energy withdrawn from the active fluid characterizes the efficiency of the turbine.

SUMMARY OF THE INVENTION

It is accordingly an object of the invention to provide a steam turbine with a high efficiency. A further object of the invention is to provide a steam turbine blade or vane that enables a higher efficiency of the steam turbine to be obtained.

With the foregoing and other objects in view there is provided, in accordance with the invention, a steam turbine that includes a duct wall with at least one region having a grooved structure with spaced apart groove cusps. The duct wall defines a flow duct extending along an axis, and blading is configured in the flow duct.

In such a steam turbine, a flow through the flow duct by an active fluid along a main flow direction, which differs locally, can be influenced in specified manner by means of the grooved structure applied to the duct wall. The duct wall does not then have to be a continuous surface. The duct wall is preferably composed of an inner wall and an outer wall of an annular flow duct. The influence on the flow through the duct relates particularly to transverse flows directed transversely to the main flow direction of the active fluid, i.e. to vortices which are damped by an increased flow resistance caused by the grooved structure. Since such transverse flows can cause a reduction in the efficiency, the damping of such transverse flows can contribute to increasing the efficiency of the steam turbine.

In accordance with an added feature of the invention, each blade or vane is preferably arranged in a blading ring. A spacing surface is located between two blades or vanes in adjacent blading rings, and this spacing surface is part of the duct wall. The grooved structure with the groove cusps extends on the spacing surface. The active fluid flows between two adjacent blades or vanes along the main flow direction fixed by the blades or vanes. The spacing surface can extend in the main flow direction beyond a connecting line between the end points of adjacent blades or vanes. The expression "located between" is used to define the position of the spacing surface rather than as a strict definition of its extent along the main flow direction. The spacing surfaces of a blading ring offer a particularly effective possibility of damping possibly occurring transverse flows by means of a grooved structure applied to these surfaces. The term blading ring is to be understood, for example, as a configuration in which the blades or vanes are arranged between an inner and an outer boundary, ring-shaped in each case, or in which the blades or vanes are only fastened at one end, for example on a rotor of a turbine.

In accordance with an additional feature of the invention, each blade or vane has an airfoil with an airfoil profile ending at the spacing surface, each groove cusp extending on the spacing surface being associated with an adjacent airfoil profile. The groove cusp is directed approximately in alignment with this airfoil profile. In consequence, the grooved structure is directed approximately along the main flow direction of an active fluid and therefore approximately at right angles to possibly occurring transverse flows. This leads to an increased flow resistance at right angles to the main flow direction and therefore to a damping of the transverse flows.

In accordance with another feature of the invention, a first part of the blading is preferably designed as rotor blades. A second part of the blading is preferably designed as guide vanes.

In accordance with a further feature of the invention, the blades or vanes each have a root part. The root part enables a set of these blades or vanes to be inserted into a peripheral slot of a rotor or of a casing so that the peripheral slot is shared by the set of these blades or vanes. In the case of a set of blades or vanes of a blading ring formed by this means, the root parts of these blades or vanes abut one another. Each of these root parts has a duct-end root part surface which forms part of the duct wall. The duct wall can be provided with a grooved structure in that the grooved structure is applied to the duct-end root part surface, i.e. to the root parts of the blades or vanes. A grooved structure can therefore be applied in a simple manufacturing manner to the root part of an individual blade or vane before its installation in the turbo-machine.

In accordance with a further added feature of the invention, one of the blades or vanes is also preferably fitted into a slot of a rotor or of a casing, which slot is designed for only one single blade or vane. A complete blading ring is preferably formed by such blades or vanes. In this case, the spacing surface is substantially formed by the surface of the rotor located between respective slots of adjacent blades of this blading ring.

In accordance with a further additional feature of the invention, some of the blading is connected together to form a composite in such a way that each of these blades or vanes can only be destructively released from the composite. This composite is preferably a blading ring or a part of a blading ring. This blading ring or this part of a blading ring can be manufactured by welding, for example, or by eroding blades or vanes out of a solid workpiece or a plurality of solid workpieces which are subsequently joined together.

In accordance with another added feature of the invention, the distance between adjacent groove cusps is preferably between 0.01 millimeter and 10 millimeters. Each two adjacent groove cusps also preferably enclose a groove bottom and form a groove. The groove depth of each groove, measured from a connecting line between the groove cusps and the deepest point of the groove bottom, is preferably between 1 micron and 1 millimeter.

In accordance with another additional feature of the invention, each blade or vane preferably has an airfoil with an airfoil grooved structure extending in at least some areas on at least one airfoil. A flow of an active fluid through the turbo-machine can, in this manner, also be influenced by a grooved structure on the airfoils.

With the foregoing and other objects in view there is also provided, in accordance with the invention, a steam turbine blading component that is a blade or a vane. The blading component includes a root portion having a fastening portion for fastening the root portion to a steam turbine; a blading surface; a blading axis extending through the blading component; and an airfoil having an airofoil surface with a root region, a central region, and a tip region. The central region is disposed between the tip region and the root region, and the airfoil ends at the root portion of the blading surface. The blading surface has a grooved structure for influencing a flow of an active fluid around the blading surface, and the grooved structure has spaced apart groove cusps. The grooved structure extends in at least one region selected from the tip region and the root region. The central region being smooth. A flow around the blades or vanes is influenced by the grooved structure in each of the end regions of an airfoil. Smooth is here understood to mean that the surface of the central region has, at most, grooves, roughness or protrusions which are low or small compared with the grooves in the root region and/or in the tip region.

In accordance with an added mode of the invention, each groove cusp preferably extends at an angle to a plane at right angles to the blade or vane axis. A first groove cusp is provided which extends at a first angle a1 to this plane and a second groove cusp is provided which extends at second and different angle a2 to the plane.

A flow around the blades or vanes installed in a turbo-machine can be influenced by the grooved structure on the blading surface in such a way that there is an improvement in the efficiency of the turbo-machine. In particular, possibly occurring transverse flows can be attenuated with the aid of the grooved structure. Transverse flows are auxiliary flows occurring transverse to the main flow direction of the active fluid. Because such transverse flows can cause a loss of efficiency, the efficiency can be increased by attenuating them.

In accordance with an additional mode of the invention, the root part of the blade or vane represents a fastening appliance ending at the airfoil and by means of which the blade or vane can be connected to the turbo-machine, for example to the rotor or to the inner casing of a turbine. By this means, root parts can combine a plurality of blades to produce a blading wheel and also to produce a single part, for example to produce one forming a wheel. The blade or vane can also have a tip part which is, for example, suitable for sealing a leakage flow through a gap between the blade or vane and the casing or rotor of a turbomachine.

The term "grooved structure" also includes the possibility that the design of the structure can be different in different regions of the blade or vane surface or that regions of the blade or vane surface separated from one another can, under certain circumstances, have differently designed grooves. The grooves can, therefore, differ from place to place on the blade or vane surface, for example with respect to their depth, width, shape or the direction in which they extend.

In accordance with another mode of the invention, the first groove cusp is preferably located in a region of the root part or in a root region. The first groove cusp preferably extends at a first angle a1 which is being between 0° and 20°.

In accordance with a further mode of the invention, the root part preferably has a root part surface over at least part of which the grooved structure extends. Also preferred is a tip part, located opposite the root part along the blade or vane axis and provided with a tip part surface over which the grooved structure extends at least partially. The second groove cusp, in particular, is preferably located in the tip part surface. The grooved structure can extend in a different direction on the tip part surface compared with that in other regions of the blade or vane surface. It is precisely in the end regions of a blade or vane that transverse flows can occur so that attenuating them can mean an improvement in efficiency. Because the root and/or tip part preferably has or have a grooved structure, possibly occurring transverse flows can be purposefully attenuated in these regions.

In accordance with a further added mode of the invention, the distance between adjacent groove cusps is preferably between 0.01 millimeter and 10 millimeters. Each two adjacent groove cusps also preferably enclose a groove bottom and form a groove. The groove depth of each groove, measured from a connecting line between the groove cusps and the deepest point of the groove bottom, being between 1 micron and 1 millimeter.

Other features which are considered as characteristic for the invention are set forth in the appended claims.

Although the invention is illustrated and described herein as embodied in steam turbine and blade or vane for a steam turbine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
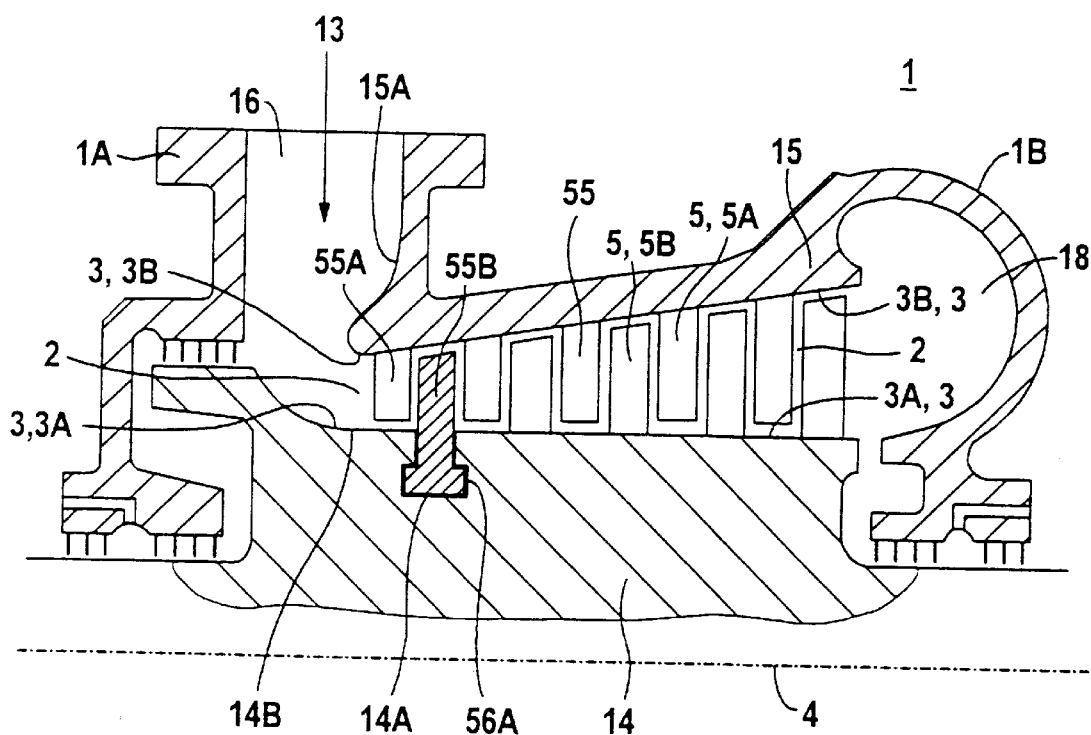
FIG. 1 shows a longitudinal section through a steam turbine.

Referring now to the figures of the drawings and first, particularly, to FIG. 1 thereof, there is seen a longitudinal section through a steam turbine 1 directed along an axis 4 from an inlet end 1A to an outlet end 1B. Only one half of the representation, which is symmetrical about the axis 4, is shown. A rotor 14 with a surface 14B extends along the axis 4 and is surrounded in some regions by a casing 15 with an inner surface 15A. The casing 15 has a circular cross-section inlet duct 16, which is directed at right angles to the axis 4, for a supply of an active fluid. The active fluid driving the steam turbine 1 is preferably steam 13. The inlet duct 16 opens into an annular flow duct 2 which extends along the axis 4 from the inlet end 1A to the outlet end 1B and is bounded by a duct wall 3. The duct wall 3 includes an inner wall 3A which is formed by a part of the surface 14B of the rotor 14. The duct wall 3 also includes an outer wall 3B which is formed by a part of the inner surface 15A of the casing 15. Whereas the inner wall 3A presents a cylinder coaxial with the axis 4, the outer wall 3B forms a truncated cone coaxial with the axis 4. This truncated cone widens from the inlet end 1A to the outlet end 1B so that the flow duct 2 has a cross-sectional area that increases along the axis 4. The flow duct 2 opens into an outlet duct 18 which is directed at right angles to the axis 4 and at right angles to the inlet duct 16. A number of blades and vanes 5 in respective blading rings 55 are respectively arranged along the flow duct 2. Each blade or vane 5 is directed along a blade or vane axis 57 (see FIG. 3). The blade or vane axis 57 of each blade or vane 5 is directed at right angles to the axis 4, and each blade or vane 5 is of such length that it extends substantially over the complete height of the flow duct 2. Blading rings 55A with guide vanes 5A and blading rings 55B with rotor blades are arranged alternately along the axis 4. The guide vanes 5A are anchored to the casing 15, while the rotor blades 5B are connected to the rotor 14. One blading ring 55B with rotor blades 5B shows, as an example, how a rotor blade 5B is, by means of an inverted-T fastening part 56A, fitted into a correspondingly shaped slot 14A of the rotor 14.

Figure 4:
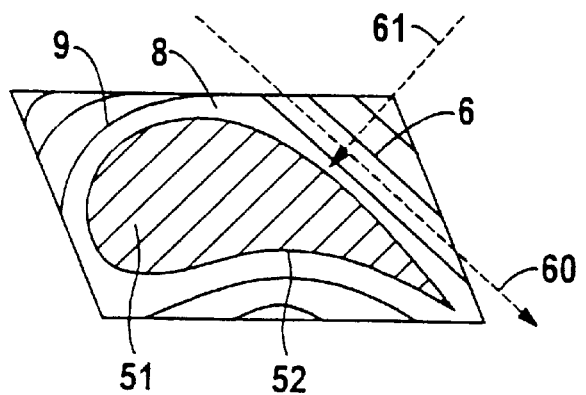
FIG. 4 shows a cross-section through the turbine blade shown in FIG. 3.

During operation of such a steam turbine 1, an active fluid, in this case steam 13, flows via an inlet duct 16 along a locally changing main flow direction 60 (see FIG. 4) through the flow duct 2 and emerges again from the steam turbine 1 via the outlet duct 18. In the flow duct 2, the steam 13 is directed by the guide vanes 5A onto the rotor blades 5B. The forces exerted by the steam 13 on the rotor blades 5B cause the rotor 14 to rotate. Kinetic energy from the steam 13 is therefore converted into kinetic energy of the rotor 14. The rotary motion of the rotor 14 can, for example, be employed to generate electrical energy in a generator (not shown). In addition to the main flow direction 60 of the steam 13, transverse flows directed transversely to the main flow direction 60 can additionally appear in the flow duct 2 (see FIG. 4).

Such transverse flows 61 usually represent an energy loss from the steam 13 which is not converted into mechanical energy of the rotor 14 and which therefore signifies a reduction in efficiency. A grooved structure 6 applied to the duct wall 3 (not shown in FIG. 1, but shown in FIG. 2) acts against such transverse flows 61.

Figure 2:
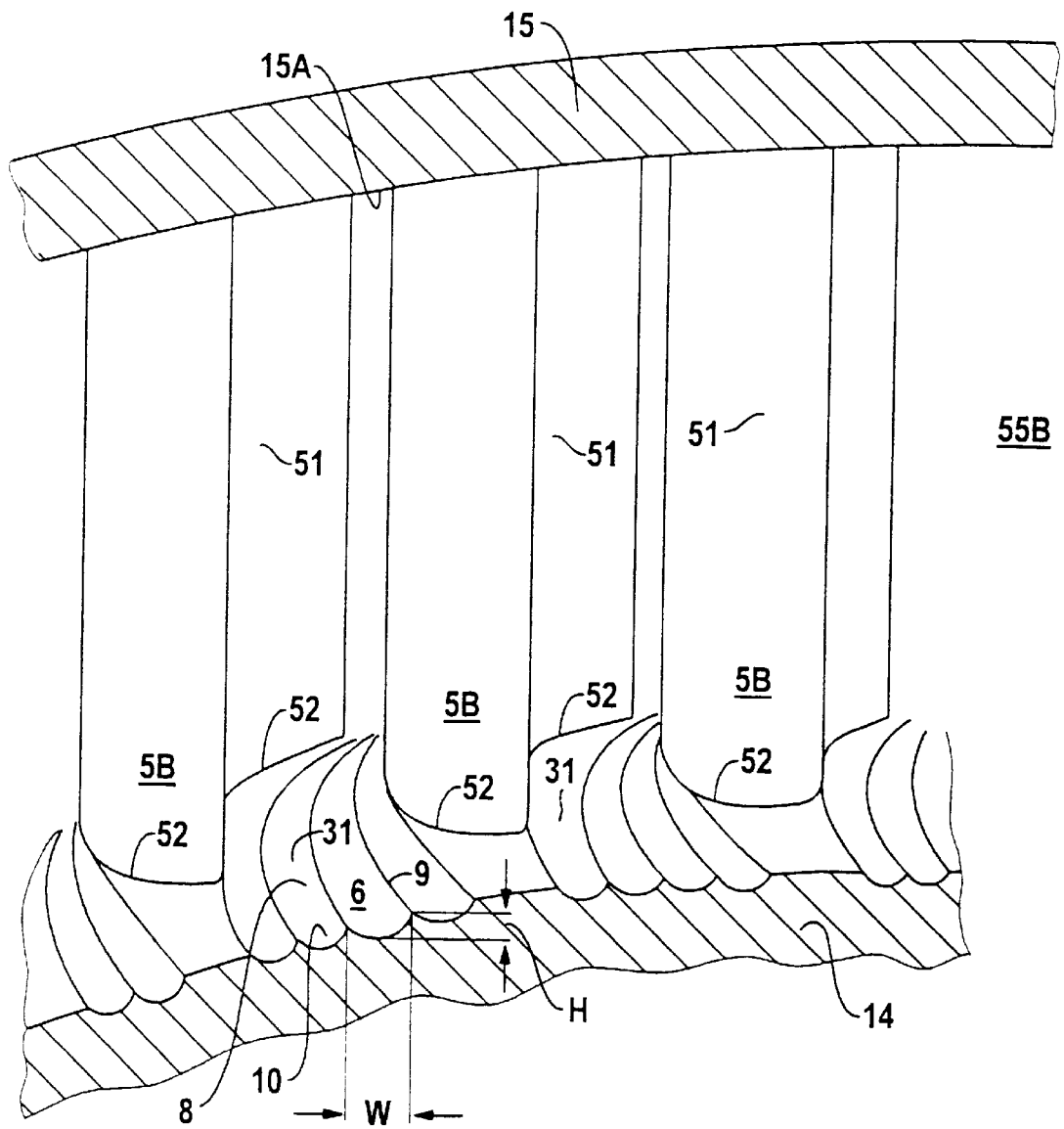
FIG. 2 shows a perspective view of a blading ring with a grooved structure.

FIG. 2 shows, a portion of a blading ring 55B with rotor blades 5B. The rotor blades 5B are arranged along the periphery of the rotor 14. Each rotor blade 5B is connected to the rotor 14. Each rotor blade 5B has an airfoil 51. Each airfoil 51 is bounded, at an airfoil profile 52, by the rotor 14. A spacing surface 31 is located between each two adjacent rotor blades 5B. This spacing surface 31 is bounded by the airfoil profiles 52 of these two rotor blades 5B along a main flow direction 60 of the steam 13 flowing around blading ring 55B. The spacing surface 31 extends in the main flow direction 60 beyond a region located exclusively between the two rotor blades 5B. The boundary of each rotor blade 5B, formed by its end opposite the rotor 14, is on the inside 15A of the casing 15 but the rotor blade 5B does not touch A the casing 15, i.e. a gap is left. An appropriate seal (not shown), for example mutually engaging teeth of the rotor blade 5B and the casing 15, substantially seals this gap. A grooved structure 6 with groove cusps 9 extends on each spacing surface 31. Each two adjacent groove cusps 9 enclose a groove bottom 10 and form a groove 8. Each groove 8 has a distance w from one groove cusp 9 to another groove cusp 9 and a groove depth h measured from the groove bottom 10 of the groove 8 to a connecting line between its groove cusps 9. The grooves 8 of the grooved structure 6 can also, however, have different widths and heights and even shapes, depending on the respective flow relationships. Each groove cusp 9 is directed in alignment with the airfoil profile 52 nearest the groove cusp 9. Such a grooved structure 6 guides an active fluid flowing through the blading ring 55B along the main flow direction 60 (see FIG. 4) and attenuates a possibly occurring transverse flow 61 directed transversely to this main flow direction 60 (see FIG. 4), for example a vortex. The attenuation is created by an increased flow resistance to this transverse flow 61, and such an attenuation usually signifies an increase in efficiency.

Figure 3:
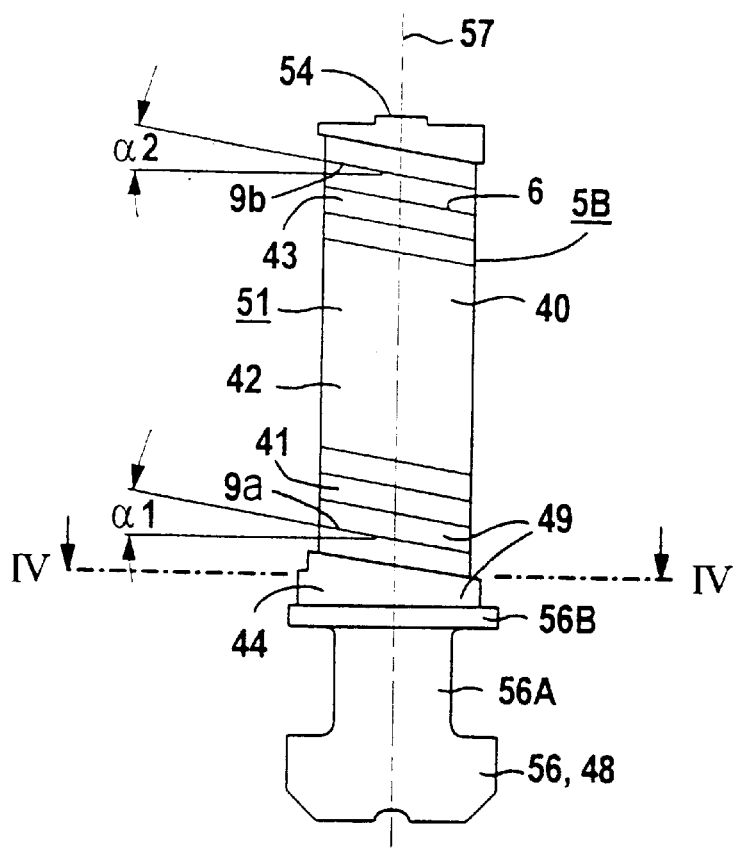
FIG. 3 shows a side view of a turbine blade.

FIG. 3 shows a side view of a rotor blade 5B. The rotor blade 5B is directed along a blade axis 57. A root part 56, with an inverted-T fastening part 56A and a platform 56B directed transversely to the blade axis 57, an airfoil 51 and a tip part 54 extend along the blade axis 57. A grooved structure 6 is applied to the surface of the airfoil 51. The grooved structure 6 extends on the airfoil surface 51a (FIG. 6) ending at the root part 56 in the root region 41 and ending at the tip part 54 in the tip region 43. The central region 42 of the airfoil surface 51a is smooth. When an active fluid 11 flows over the blade 5, only the flow in the boundary regions of the airfoil 51 is purposefully influenced by the grooved structure 6. Because it is precisely in such boundary regions that transverse flows can occur, an attenuation of these transverse flows is purposefully possible in the boundary regions.

The rotor blade 5B is inserted by means of its fastening part 56A into a slot 14A (see FIG. 1). A blading ring 55B is formed in this way from a plurality of similar rotor blades 5B by the mutual abutment of the respective root parts 56 of rotor blades 5B. The root platforms 56B of the rotor blades 5B form a part of the duct wall 3. A grooved structure 6 is applied to the root platforms 56B. This is clear in the cross-section through the rotor blade 5B shown in FIG. 4. The grooved structure 6 with groove cusps 9 extends on the trapezoidal root platform 56B. The outline of the cross-sectional profile shows an airfoil profile 52, with the groove cusps 9 following the course of this airfoil profile 52.

Figure 5:
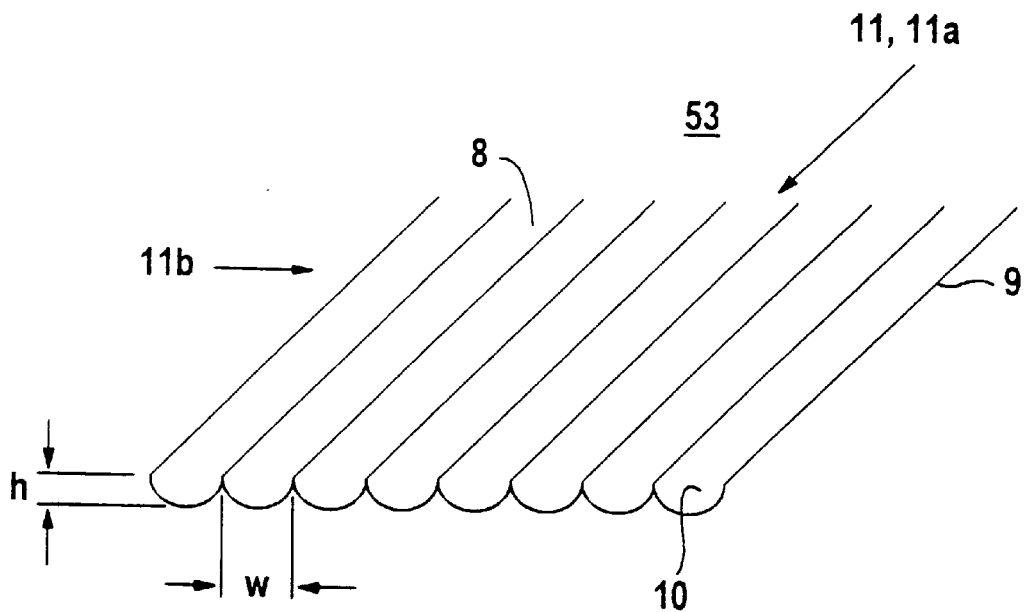
FIG. 5 shows a diagrammatic representation of a grooved structure.

FIG. 5 diagrammatically represents a grooved structure 6. Approximately U-shaped grooves 8 are configured parallel to one another on a surface and directly abut each other. The grooves 8 are bounded by groove cusps 9 which include a groove bottom 10. In this example, the distance w from a groove cusp 9 to an adjacent groove cusp 9 is always the same. The height h from the deepest point of a groove bottom 10 to a connecting line between the bounding groove cusps 9 is likewise the same for each groove. The grooved structure 6 is directed parallel to a flow of an active fluid 11 around the airfoil. A transverse flow 11b can occur in addition to a main flow direction 11a of the active fluid 11. This transverse flow 11b experiences an increased flow resistance because of the transversely directed grooved structure 6 and can be damped in this way, which can lead to an improvement in efficiency.

Figure 6:
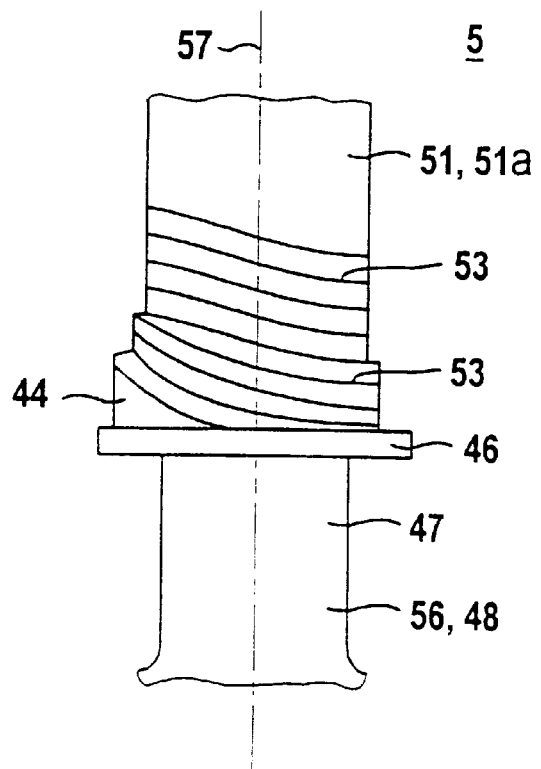
FIG. 6 shows a portion of a side view of a steam turbine blade with root part.

A partial side view of a steam turbine blade 5 is shown in FIG. 6. In this embodiment, the grooved structure 6 also extends onto a root transition region 44 of the root surface of the root part 56. In this way, flow around the blade can also be influenced over the root part surface. A grooved structure 6 can be directly provided during the manufacture of the blading 15 but it can also be applied subsequently.

We claim:

1. A steam turbine, comprising:
    a duct wall including at least one region having a grooved structure with spaced apart groove cusps, said duct wall defining a flow duct extending along an axis;
    at least one blading ring configuring blading in said flow duct; and
    a spacing surface disposed on said duct wall between adjacent ones of said blading, said grooved structure disposed on said spacing surface.

2. The steam turbine according to claim 1, wherein:
    said blading includes an airfoil with an airfoil profile ending at said spacing surface; and
    each one of said groove cusps extending approximately in alignment with said airfoil profile of at least one of said adjacent ones of said blading.

3. The steam turbine according to claim 1, wherein said blading includes rotor blades.

4. The steam turbine according to claim 1, wherein said blading includes guide vanes.

5. The steam turbine according to claim 1, wherein:
    at least some of said blading includes a root part;
    said duct wall includes a peripheral slot which receives said some of said blading so that said root part of each of said some of said blading abuts said root part of another one of said some of said blading.

6. The steam turbine according to claim 1, wherein said duct wall includes a peripheral slot which receives a single one of said blading.

7. The steam turbine according to claim 1, wherein adjacent ones of said groove cusps are separated by a distance of between 0.01 millimeter and 10 millimeters.

8. The steam turbine according to claim 1, wherein adjacent ones of said groove cusps enclose a groove with a groove bottom, said groove has a groove depth defined by a distance between a deepest point of said groove bottom and an imaginary line connecting said adjacent ones of said groove cusps, and said groove depth is between 1 micron and 1 millimeter.

9. The steam turbine according to claim 1, wherein said blading includes an airfoil with a grooved structure formed on said airfoil.

10. A steam turbine blading component, comprising a blading component selected from the group consisting of a blade and a vane, said blading component including:
    a root portion having a fastening portion for fastening said root portion to a steam turbine;
    a blading surface;
    a blading axis extending through said blading component; and
    an airfoil having an airfoil surface with a root region, a central region, and a tip region, said central region disposed between said tip region and said root region, said airfoil ending at said root portion of said blading surface;
    said blading surface having a grooved structure for influencing a flow of an active fluid around said blading surface, said grooved structure having spaced apart groove cusps, said grooved structure extending in said tip region and said root region, and said central region being smooth.

11. The steam turbine blading component according to claim 10, wherein a first one of said groove cusps extends at a first angle with respect to a plane extending at a right angle with respect to said blading axis, a second one of said groove cusps extends at a second angle with respect said plane, and said first angle is different from said second axis.

12. The steam turbine blading component according to claim 11, wherein said first one of said groove cusps is disposed in a location selected from the group consisting of said root portion of said blading surface and said root region of said airfoil, and said first angle is between 0° and 20°.

13. The steam turbine blading component according to claim 12, wherein said second one of said groove cusps is disposed in said tip region of said airfoil, and said second angle is between 20° and 60°.

14. The steam turbine blading component according to claim 11, wherein said second one of said groove cusps is disposed in said tip region of said airfoil, and said second angle is between 20° and 60°.

15. The steam turbine blading component according to claim 14, comprising a tip portion remote from said root portion, said grooved structure extending onto said tip portion, said second one of said groove cusps extending onto said tip portion.

16. The steam turbine blading component according to claim 10, comprising a tip portion remote from said root portion, said grooved structure extending onto said tip portion.

17. The steam turbine blading component according to claim 10, wherein adjacent ones of said groove cusps are separated by a distance of between 0.01 millimeter and 10 millimeters.

18. The steam turbine blading component according to claim 10, wherein adjacent ones of said groove cusps enclose a groove with a groove bottom, said groove has a groove depth defined by a distance between a deepest point of said groove bottom and an imaginary line connecting said adjacent ones of said groove cusps, and said groove depth is between 1 micron and 1 millimeter.

* * * * *